Nov. 21, 1944.  G. F. SALISBURY  2,363,087
WIND COURSE INDICATING MEANS
Filed Jan. 28, 1942   3 Sheets-Sheet 2
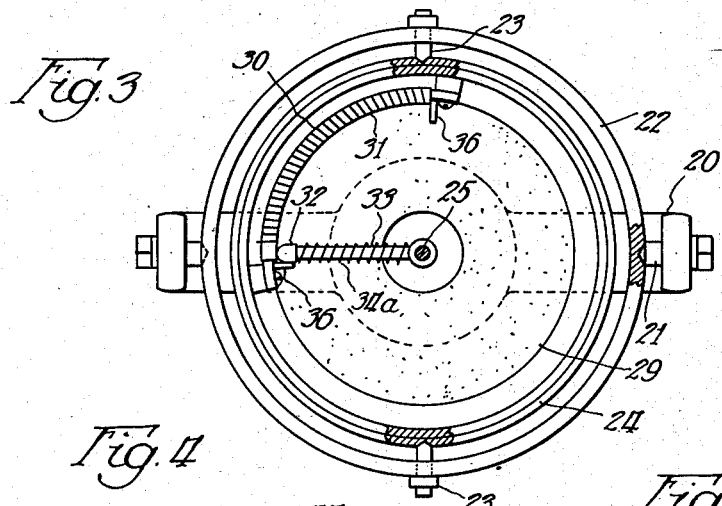
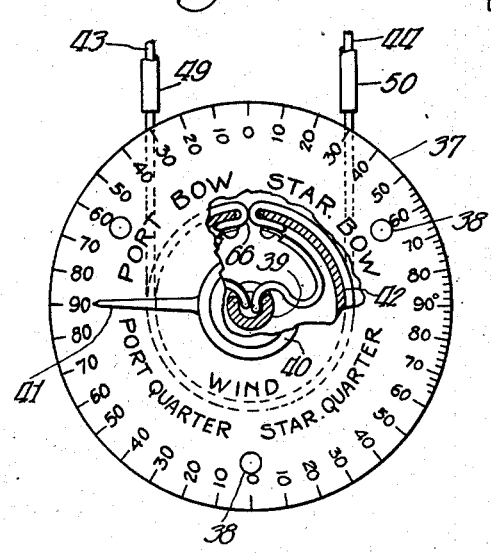
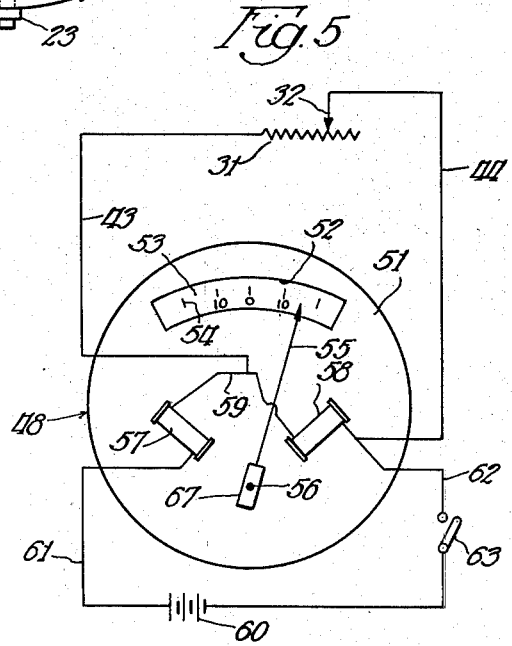
Inventor
George F. Salisbury Nov. 21, 1944.  G. F. SALISBURY  2,363,087
WIND COURSE INDICATING MEANS
Filed Jan. 28, 1942  3 Sheets-Sheet 3
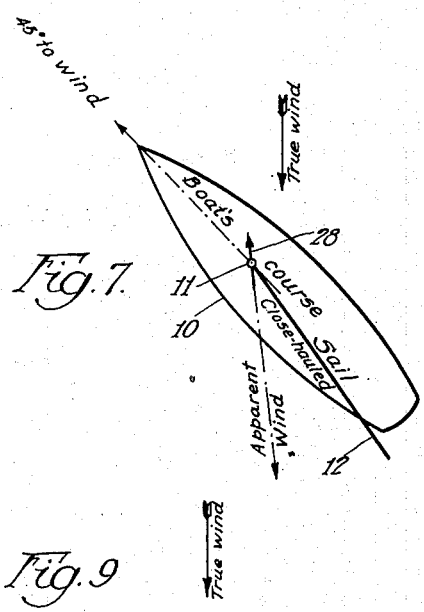
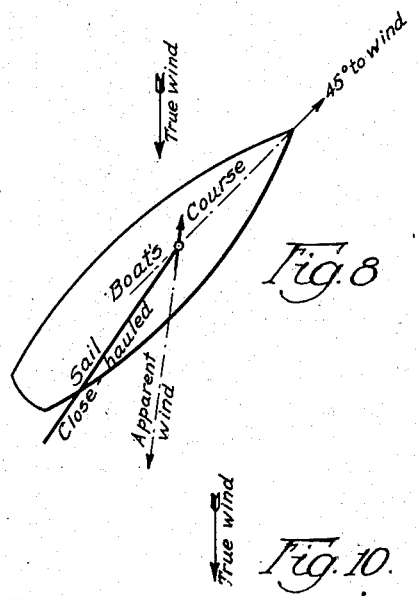
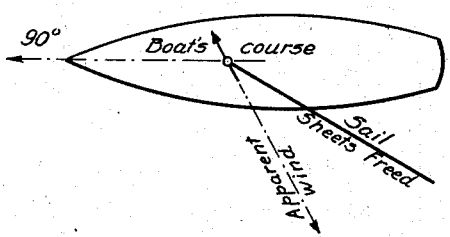
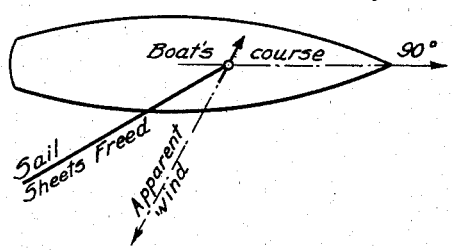
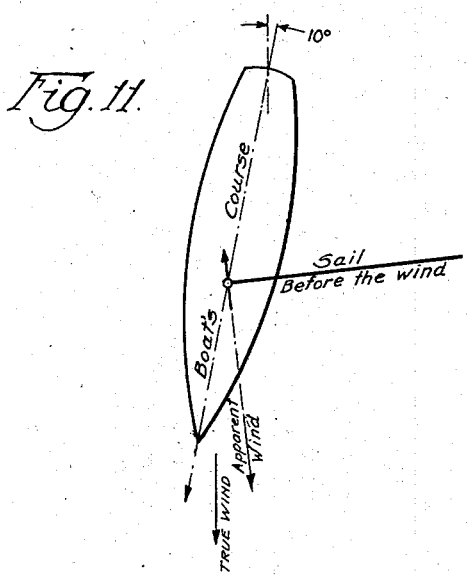
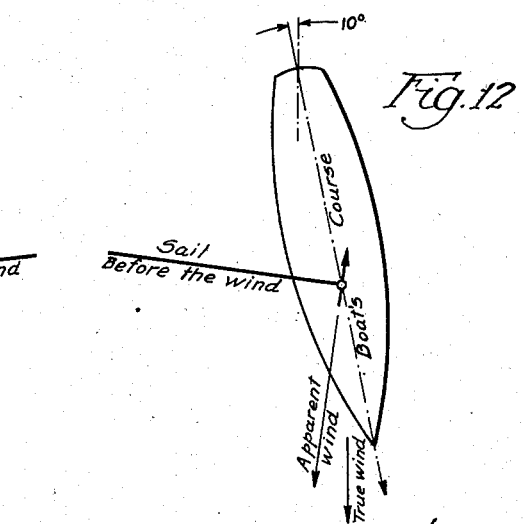
Inventor
George F. Salisbury Patented Nov. 21, 1944

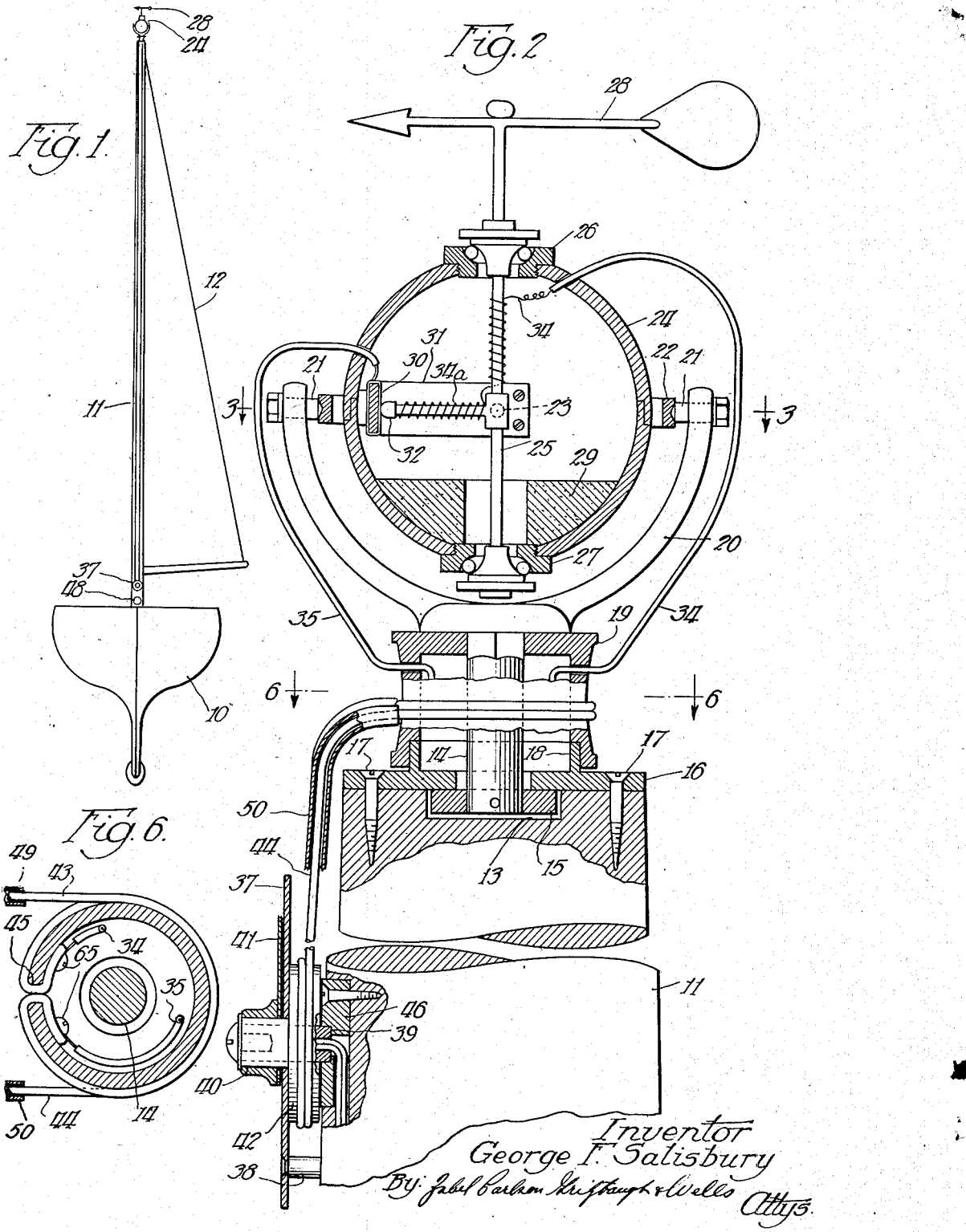

2,363,087

UNITED STATES PATENT OFFICE 2,363,087

WIND COURSE INDICATING MEANS

George F. Salisbury, Kenilworth, Ill.

Application January 28, 1942, Serial No. 428,497

9 Claims. (Cl. 73—188)

This invention relates to an improvement in wind-course indicating means for sailboats and more particularly a device to indicate variations in the course of a sailboat from the relative direction of the apparent wind.

It is the usual practice in sailboats to provide a wind pennant or the like at the top of the mast to indicate the wind direction. In order to attain maximum speed it is necessary to set the sails at the most efficient angle to the direction of the breeze when on the desired course. If the wind shifts or if the compass course is changed inadvertently, efficiency is lost and speed is reduced. Therefore it is customary to attempt to hold to the wind course for which the sails have been set by keeping the angular relationship between the pennant and the sails as nearly constant as possible until it becomes apparent that the compass course should be altered or the sails should be reset. But such pennants are not always readily visible from the cockpit of the boat; moreover relatively small variations in the course of the boat may not be apparent by visually comparing the angular relationship of the sail to the pennant.

The principal object of my invention is to provide a vane balanced in gimbals at the top of the mast together with means accurately to compare the angular relationship of the vane to the fore and aft center line of the boat. Such a device is of advantage not only as a compass in assisting one to maintain his course with respect to the wind, but it also provides valuable information as to the optimum angular disposition of the sail with respect to the boat for that particular course.

A further object of my invention is to provide for sailboats a wind-course indicating means which may be disposed in the cockpit of the boat and which is readily visible to the helmsman, and also to provide in the cockpit adjusting and setting means for the control mechanism which is preferably located at the top of the mast.

The preferred embodiment of my invention provides electrically actuated indicating means.

My invention further contemplates a common means for connecting the various parts of the device both mechanically and electrically.

Reference is hereby made to the drawings in which like reference numerals represent like parts:

Fig. 1 is an elevation of a sailboat embodying a preferred form of my invention;

Fig. 2 is a vertical sectional view taken through the top of the mast;

Fig. 3 is a section taken along line 3—3 of Fig. 2;

Fig. 4 is an elevation of the manually operated adjusting and setting means located in this case at the bottom of the mast;

Fig. 5 is a circuit diagram of my invention, also showing the indicating device;

Fig. 6 is a section taken along line 6—6 of Fig. 2;

Figs. 7, 8, 9, 10, 11 and 12 are diagrammatic views illustrating the various positions of the boat with respect to the true wind direction and the apparent wind direction.

With reference to the drawings, reference numeral 10 designates generally a boat which is provided with a mast 11 and a sail 12. In Figs. 7 to 12, inclusive, I have illustrated various positions of a boat with respect to the wind under the conditions of beating-into the wind, reaching, and running before the wind. Figs. 7, 9 and 11 indicate the boat positions on the starboard tack while Figs. 8, 10 and 12 indicate the boat positions on the port tack. The position of the wind pennant or vane at the top of the mast is always pointed into the apparent wind when the boat is in motion. The apparent wind does not coincide with the true wind direction except in the case where the boat is standing still. Because of the movement of the boat, for example, in Figs. 7 and 8, it will be noted that the apparent wind makes a substantial angle with respect to the true wind course and this angle depends upon the speed at which the boat is travelling along its course. As shown in the drawings, the boat is beating into the wind at an angle of 45° to the true wind course. The sails are close-hauled and the apparent wind makes an angle of less than 45° with the boat. Similarly when sailing at right angles to the direction of the true wind there is an apparent wind direction which is at an even greater angle with respect to the true wind direction and in running before the wind it is not possible to hold the boat's course exactly in line with the true wind, so in this case there is again an apparent wind at a slight angle to the true wind. In all of these cases the wind vane at the top of the mast will of course follow the apparent wind. The skipper of the sailboat knows just what is the proper angle at which he should hold the boat with respect to the apparent wind to get the best possible sailing speed out of it. Therefore, if he could take the guess work out of determining the angular position of the boat with respect to the apparent wind it would be much easier for the helmsman to hold the boat to the wind course for which the sails have been set. The vane or pennant will shift with any shift in wind direction and in such case the helmsman must shift the position of the boat so as to follow the wind change until it is desired to change the compass course or reset the sails. In the present apparatus I have provided an adjustable indicator which enables the desired angular position of the boat with respect to the apparent wind to be set by means of an arrow on the indicator, whereupon any deviation of the actual angular position of the boat with respect to the wind vane and the apparent wind will produce a deviation from normal or zero point upon an electrically operated indicating instrument which is also immediately before the helmsman. The helmsman therefore need not watch the wind vane or pennant but can confine his attention to steering so as to maintain the indication upon the electrical indicating instrument at zero.

At the top surface of the mast is a recess as at 13, and a shaft 14 which extends into said recess, the shaft being provided with a collar 15. A plate 16 fits over the top of the mast and is secured thereto by screws 17, and confines the collar 15 in the recess 13. The plate is provided with an upstanding flange 18 on which a hub member 19 is rotatably mounted. The hub member is also secured to the shaft 14 so that the two may be rotated freely with respect to the mast.

A housing 24 is suspended at the top of the mast by a gimbal, which includes a two-arm yoke 20 mounted on the hub member 19 and provided with pivot pins 21 which support a ring 22 at diametrically opposite points thereof. The ring in turn is provided with the pivot pins 23 which are disposed at 90° from the pivot pins 21, and these pivot pins 23 support the housing 24 which may be of generally spherical shape. The housing is weighted by a ring-shaped member 29 so that it will tend to assume the vertical position irrespective of the inclination of the mast.

A shaft 25 is vertically journalled in the housing 24 by means of ball bearing units 26 and 27 which are disposed at the top and bottom thereof. A wind vane 28 is secured to the shaft above the housing so as to cause rotation of the shaft with the wind.

A rheostat 30 is disposed within the housing and consists of a resistance 31 in the form of a coil of wire or otherwise, disposed in a 90° arc, all points of which are of equal distance from the axis of the shaft 25. A sliding contact 32 is carried on an arm 33, the arm being affixed to the shaft 25. The contact 32 may be spring-pressed outwardly by a spring 34a which forms part of a lead 34 that extends from the sliding contact 32 through the housing 24 and follows down one of the arms of the yoke 20 and extends into the hub 19. The lead 34 is provided with sufficient slack exteriorly of the housing so as to permit the movement of the latter with respect to the yoke, and within the housing it may be wound around a part of the shaft 25 and connected to the spring 34a. There is sufficient slack within the housing to permit free rotation of the shaft. A similar lead 35 extends from the resistance 31 to the interior of the hub 19. Stops 36 are provided at either end of the resistance which limit the movement of the sliding contact 32 and of the vanes 28 with respect to the housing.

A dial 37 is secured to the mast 11 at the lower portion thereof by means of spacers 38. A hollow shaft 39 is journalled in the dial and extends into a plate 46 fastened to the mast. A knob 40 is affixed to the exterior end of the shaft 39, and a pointer 41 is associated with the knob. A pulley 42 is also mounted on the shaft, and the cables 43 and 44 which comprise flexible insulated conductors cooperate with the pulley.

The dial 37 is provided with indicia indicating in degrees in the respective quadrants the direction of the apparent wind with respect to the course of the boat. The cables at their upper ends are associated with the hub 19 so that rotation of the knob 40 will cause a corresponding rotation of the hub 19.

An aperture 45 as shown in Fig. 6 is provided in the hub 19, and each of the cables after passing around the hub for almost a complete turn, extends into the aperture and terminates on the interior surface of the hub, the ends of the cables being affixed to the hub by suitable screws or binding posts 65. The leads 34 and 35 which also terminate in the interior of the hub 19 are (exteriorly) connected to the ends of the cables 43 and 44.

A similar arrangement as shown in Fig. 4 is provided for the pulley 42, the cables here extending through an aperture 66 in the pulley 42, and passing out through the hollow shaft 39 then through the plate 46 and down along the outer surface of the mast. A wind-course compass in the form of an electric indicator 48 is secured to the mast and is connected to the cables 43 and 44.

It will be seen that the cables 43 and 44 are electrically insulated from each other, and each is secured both to the hub 19 and to the pulley 42 so that rotation of the pulley will cause corresponding rotation of the hub. The cable 43 is in electric circuit with the resistance 31, and the cable 44 is in circuit with the sliding contact 32. Conduits 49 and 50 are provided along the outer surface of the mast through which the cables run.

The indicator 48 comprises a housing 51 provided with a window 52 which exposes a fixed dial 53 mounted within the housing. The dial is provided with indicia 54, which indicia comprises an intermediate point of reference designated "0," together with calibrations on either side thereof to indicate degrees corresponding to the degrees marked off on the dial 37. An indicator arm 55 is carried on a shaft 56, which shaft is journalled in the housing 51.

An electromagnet 57 is disposed within the housing at one side of the shaft 56, and an electromagnet 58 is provided at the other side of the shaft 56, both of these electromagnets being disposed above the shaft and at an angle to each other. A permanent magnet 67 is secured to the shaft 56, and is capable of aligning itself either with the core of the electromagnet 57 or with the core of the electromagnet 58, or at some point in between the two, depending upon the position of the resultant field of the magnets. A conductor 59 connects the two electromagnets and a conductor 61 connects the electromagnet 57 with one terminal of a battery 60. A conductor 62 connects electromagnet 58 with the other terminal of the battery 60, and a switch 63 is interposed in the latter conductor to open or close the circuit. Cable 43 is connected to the conductor 59 and cable 44 is connected to the electromagnet 58 so that the rheostat 30 is shunted across the electromagnet 58.

It will be seen that when the switch 63 is closed, a circuit is established through the electromagnets 57 and 58. The field of electromagnet 57 biases the indicator arm 55 to the left of the "0" point of the dial. The strength of the field created by the electromagnet 58 which serves to determine the position of the indicator arm depends upon the condition of the circuit as determined by the position of the sliding contact 32 with respect to the resistance 31. It will be seen therefore that as the course of the boat shifts with respect to the direction of the apparent wind, that the indicator arm 55 will move to the left or to the right.

In operation, the course of the boat is first determined, and the boat set upon that course. The knob 40 is then rotated, thereby causing the vane 28 to be rotated to the appropriate quadrant. At that time the sliding contact 32 no longer contacts one or the other of the stops 36, and the vane is free to rotate to its proper position as determined by the direction of the wind. At this time the switch 63 may be closed, and the indicator arm 55 will indicate approximately the number of degrees by which the sliding contact 32 is displaced from the intermediate point of the resistance 31. It will be understood that the device is adjusted so that the indicator arm 55 will point to "0" when the sliding contact is midway between either end of the resistance 31. By rotating the knob 40, the resistance 31 is caused to shift its position with respect to the sliding contact 32, which at this time remains stationary due to the action of the wind on the vane. When the indicator arm 55 points to "0," the pointer 41 will indicate the angular relationship between the course of the boat and the direction of the apparent wind.

Subsequent variations in the course of the boat one way or the other will cause a shifting of the vane 28 with respect to the mast, and a corresponding shifting of the sliding contact with respect to the resistance, thereby increasing or decreasing the amount of current flowing through the electromagnet 58. As the electromagnetic field of the latter magnet increases or decreases, the indicator arm 55 will be caused to move to the right or to the left respectively, thereby indicating a variation of the boat's course from that originally determined.

It will be seen that this device facilitates in great measure the keeping of the boat upon a course relatively constant to the direction of the apparent wind so that sails can be set for maximum efficiency under that condition. Shifts in the direction of the apparent wind will be indicated by the indicator 48, thus enabling the skipper quickly to reset his sails to take advantage of a change in wind which otherwise might go unnoticed for some time.

It is obvious that other types of indicating means may be used to indicate the angular relationship of the resistance 31 to the sliding contact 32. I have found, however, that the particular type herein shown is particularly satisfactory, due to the fact that it does not require any appreciable amount of force to move the contact 32 along the resistance. Therefore a very small load is placed on the wind vane.

Although I have shown only one preferred embodiment of my invention herein, it will be understood that various modifications and changes may be made therein, without departing from the spirit and scope of this invention which is defined in the appended claims.

I claim:

1. In a wind course indicating means for a sailboat, a wind vane at the top of the mast thereof, current indicating means at the bottom of said mast, an electric circuit including said indicating means and including two conductors extending to the top of the mast, a resistance rotatably mounted at the top of said mast and in circuit with one of said conductors, a sliding contact cooperating with said resistance and in circuit with the other of said conductors and actuated by said wind vane for causing a current change in said electric circuit, both of said conductors being anchored at their upper ends with respect to said rotatable resistance, and a manually rotatable member to which said conductors are anchored near their lower ends for the purpose of shifting the longitudinal position of said conductors to cause said resistance to rotate with respect to said sliding contact.

2. In a wind course indicating means for a sailboat, a housing mounted in a gimbal at the top of the mast thereof, a wind vane rotatably mounted in said housing, a rotatable member remotely disposed from said housing, two cables adapted for longitudinal displacement and disposed along said mast extending between said housing and said rotatable member and secured at either end to each, whereby rotation of said rotatable member will cause a corresponding rotation of said gimbal and said housing, and indicating means at the bottom of said mast to indicate the relative angular position of said wind vane with respect to said housing.

3. In a wind course indicating device including an electric circuit and power source therefor, means to control the current conditions in said circuit, wind actuated means drivingly connected therewith, and indicating means, mechanically independent of said wind actuated means, responsive to the current conditions in said circuit, manually actuated setting means for said control means and remotely disposed therefrom, and two cables extending from said manually actuated means to said control means to adjust the position thereof, said cables being in circuit with said control means and said indicating means.

4. In a wind course indicating device for a sailboat comprising a housing rotatably mounted at the top of the mast of said sailboat, a wind actuated means rotatively mounted in said housing, manually actuated setting means disposed at the bottom of said mast for said housing, two conduits extending along said mast from said manually actuated means to said housing, cables extending through said conduits and secured to said housing and to said setting means, whereby rotation of the latter will cause a corresponding rotation of the former, and an electric circuit including a current controlling means disposed in said housing the operation of which is controlled by the angular position of said wind actuated means, and a current responsive device to indicate the angular position of said wind actuated means with respect to said housing, and said cables, said cables comprising conductors which are in circuit with said current controlling means and said current responsive device.

5. A wind course indicating compass for a boat comprising in electric circuit a current controlling device having two independently shiftable elements, a current responsive device to indicate the relative deviation of said shiftable elements with respect to a predetermined relative position thereof, one of said elements being automatically shiftable in response to changes in apparent wind direction, and the other of said elements being shiftable manually to rebalance said current responsive device to a zero indication which corresponds to said predetermined relative position of said shiftable elements when the boat is reoriented on a predetermined wind course.

6. A wind course indicating compass for a boat comprising in electric circuit a current controlling device having two independently shiftable elements, a current responsive device to indicate the relative deviation of said shiftable elements with respect to a predetermined relative position thereof, one of said elements being automatically shiftable in response to changes in apparent wind direction, and manual means for shifting the other of said elements, said manual means having a calibrated scale associated therewith to indicate the position of the latter of said elements with respect to the boat to facilitate the setting of said latter element in a position so that said current responsive device will indicate a deviation in the course of the boat from a precalculated direction which represents maximum sailing efficiency.

7. A device to determine the relative direction of the wind with respect to the course of a boat, a wind vane responsive to shifts in the apparent direction of the wind, two cooperative elements having common mounting means and being independently shiftable with respect thereto and to each other, one of which elements is manually adjustable to a predetermined position with respect to said common mounting means and the other of which elements is actuated by said wind vane so as to be responsive to variations in said direction of apparent wind, remotely disposed means to indicate the relative position of said cooperating elements with respect to each other, and remotely disposed means to adjust the predetermined position of said first named element.

8. A wind course indicating means for sail boats and similar devices comprising a supporting member, a contactor arm movably supported by said member, contact arm-moving means responsive to wind direction changes with respect to said supporting member, an electric resistance element in engagement with said arm and movably supported by said member for movement in the same plane as said contact arm, manually operable means operatively connected with said resistance element for manually moving the element in said plane, and indicating means comprising an indicator electrically connected to the resistance and movable when the resistance is moved, operable to indicate the angle which a line from the midpoint of the resistance to the axis on which it rotates makes with the median line of the boat, and a second indicator electrically connected with the arm and resistance whereby it is responsive to shifting of the contact arm on said resistance to indicate deviation of the contact arm in response to wind changes from the midpoint of said resistance.

9. In a wind course indicating means for a sail boat having wind responsive means at the top of the mast thereof, indicating means at the bottom of said mast, and an electric circuit including said indicating means and including two conductors extending to the top of said mast, means for causing a change in said electric circuit, said means including two independently shiftable elements in said electric circuit, one of which is drivingly connected with at least one of said conductors, and the other of which is actuated by said wind responsive means, and means for shifting the longitudinal position of said last mentioned one of said conductors to cause said first mentioned element to be shifted into an operative position with respect to said second mentioned element, whereby said indicating means may indicate the relative position of said two elements with respect to each other.

GEORGE F. SALISBURY.